Nov. 23, 1965   J. P. FRANCIS   3,219,385
RETRACTABLE AUTOMOBILE WINDSHIELD AWNING
Filed Sept. 24, 1963
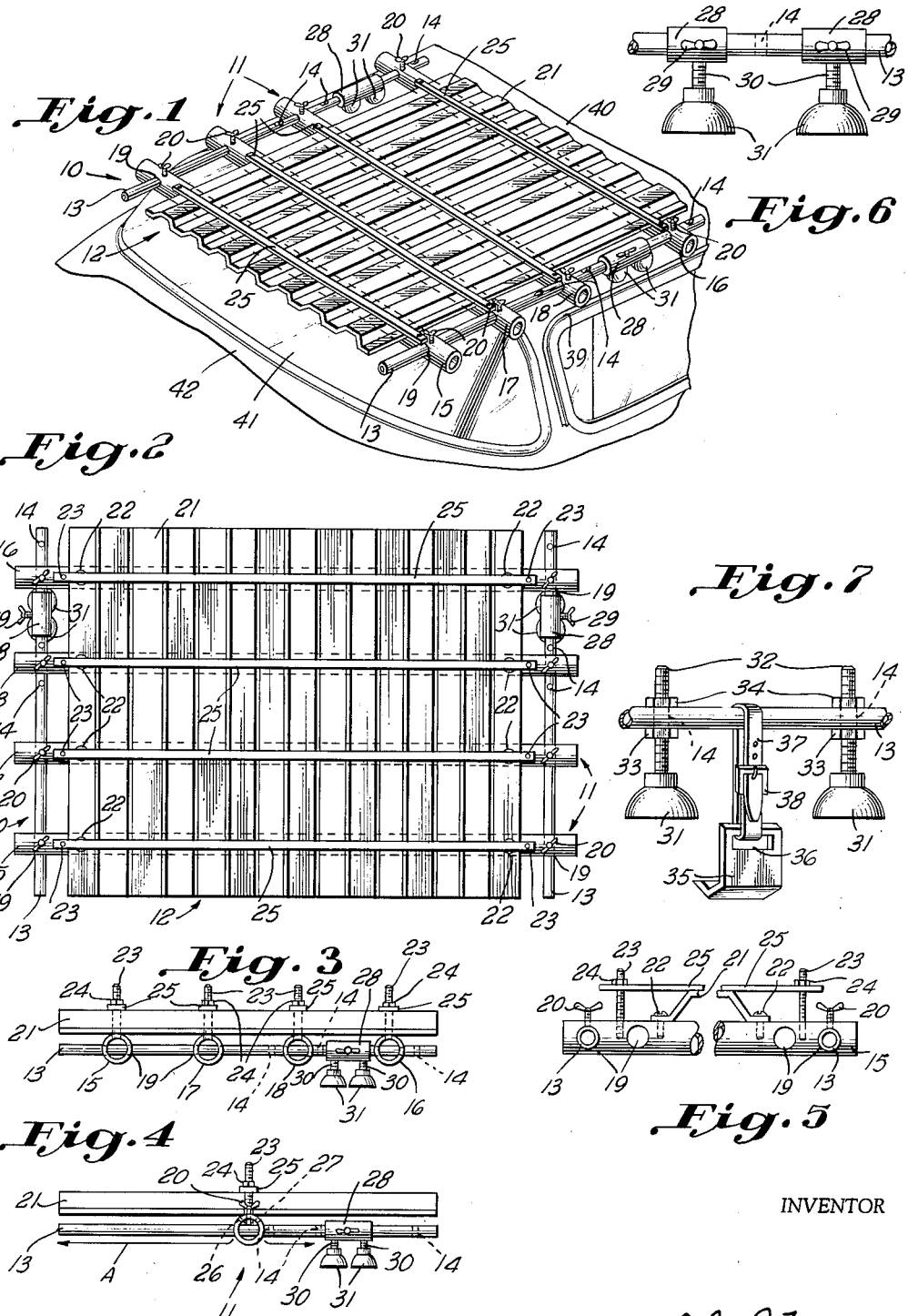
INVENTOR
John P. Francis United States Patent Office 3,219,385
Patented Nov. 23, 1965

3,219,385
RETRACTABLE AUTOMOBILE WINDSHIELD
AWNING
John P. Francis, 20 Boston St., Haverhill, Mass.
Filed Sept. 24, 1963, Ser. No. 312,271
6 Claims. (Cl. 296—95)

This invention relates to improvements in automobile windshield awnings and the adjustable frame structure for supporting the said awning, an object thereof being to provide a simple, and an improved awning structure adapted to be movably adjustable longitudinally and adjustably supported angularly relative to the roof top and the windshield area of the vehicle.

Another object thereof is to provide a permanently or a semipermanently attached awning and supporting structure, or a temporary and a partially or fully removable knockdown supporting structure adapted to support a removably attached awning structure for longitudinal movement with, or independent of the longitudinally disposed frame members of the supporting structure. The said awning and supporting structure being easily and quickly removed in whole or in part from the roof top, and disassembled in a like manner for stowage within the vehicle or elsewhere.

A still further and important object thereof is to provide protection to the windshield area and a portion of the roof top from the sun, rain, sleet, snow, or the formation of ice thereon, and to provide clean and clear visibility for proper vision at all times when viewing outdoor movies at drive-in theatres and other outdoor events, thus eliminating the continuous or the on and off use of the windshield wipers.

With these objects and still others in view, as will hereinafter more fully appear, the invention comprises certain novel constructions, combinations, and arrangement of parts, hereinafter described and claimed and illustrated in the accompanying drawings, in which:

FIGURE 1 is a perspective view, in fragment, of the front portion of an automobile, the view including a perspective view of the awning and the supporting structure shown supported over the roof top and the windshield area of the vehicle.

FIGURE 2 is a top plan view of the awning structure shown adjustably supported on a group of laterally disposed frame members of the adjustable frame structure.

FIGURE 3 is a side elevation view of the awning and frame structure showing a group of laterally disposed frame members provided with threaded members to adjustably secure the awning structure.

FIGURE 4 is also a side elevation view of the awning and frame structure, showing a modified form of a frame structure having a single laterally disposed frame member for supporting the awning structure.

FIGURE 5 is a front elevation, fragmentary view, of the forward laterally disposed frame member showing a portion of the awning structure adjustably supported to the said frame member.

FIGURE 6 is a side elevation view, of a modified form of a frame supporting and roof engaging means for supporting the frame structure; and FIGURE 7 is a side elevation view, of a modified form of a frame supporting and roof engaging means for supporting the frame structure, and provided with clamping means for adjustably securing said roof engaging means.

Referring now more specifically to the drawings, attention is directed mainly to FIGURES 1 and 2, wherein numeral 10 generally indicates the frame structure, numeral 11 generally indicates the group of laterally disposed frame members of the frame structure 10, and numeral 12 generally indicates the awning structure.

A frame and awning structure and a variation of roof engaging means are shown and described in my copending application, Serial No. 89,608, filed February 14, 1961, now U.S. Patent No. 3,131,755. My invention therefore, is concerned primarily with a modified form of an adjustable frame and awning structure.

In FIGURE 1, a portion of an automobile 42 is shown, the awning structure 12 being adjustably supported on the adjustable frame structure 10, shown supported above the roof top 40 and over the windshield area 41. The awning structure 12 is adapted to be movably supported longitudinally with, or independently of the side frame members 13 of the frame structure 10.

In supporting the adjustable frame structure 10, roof engaging means in the form of vacuum cups 31, are permanently or removably attached to the roof top 40 at the selected location laterally and longitudinally, as shown. Each vacuum cup 31 has an adjustably attached vertically disposed threaded stud member 30 attached to the longitudinal tubular frame supporting member 28, as shown in FIGURES 3 and 4, and shown in a modified form as two individual frame supporting members 28 in FIGURE 6.

In FIGURE 7, there is shown another modified form of roof engaging means comprising the vertical threaded stud members 32 adjustably attached to the vacuum cups 31. Each threaded stud member 32 extends through a preselected vertical aperture 14 of the side longitudinal frame members 13. A lower adjustable threaded nut member 33, and an upper adjustable threaded nut member 34 provides individual and adjustable supporting engagement of each vertical stud member 32 to each side frame member 13, thereby providing vertical and angular adjustment independent of any other movable adjustment of the frame structure 10.

Referring back to FIGURE 7, there is also shown conventional and well known securing means in the form of a flexible strap member 37 adapted to engage the side frame member 13 and the aperture 36 formed in the rain gutter engaging hook member 35. The buckle 38 on strap member 37 providing adjustment of said securing means in securing the roof engaging means downwardly on the roof top 40.

Referring to FIGURE 2, there is shown the adjustable frame structure 10, comprising, mainly, the two side longitudinally disposed tubular frame members 13. Each of said side frame member 13 is provided with a number of longitudinally spaced apart vertical apertures 14. Adjustably and removably attached, to each side frame member 13, are the laterally disposed frame members 15, 16, 17 and 18, each having laterally spaced apart horizontal apertures 19, shown more clearly in FIGURE 5. The laterally disposed frame members 11; comprising the forward frame member 15, the rear frame member 16, and the additional frame members 17 and 18 which are used as needed for additional support; are longitudinally and slidably movable on the said side frame members 13.

The awning structure 12, FIGURES 1, 2, 3, 4 and 5, is shown as a rigid awning panel 21, preferably corrugated-shaped, although a flat or other structural shaped awning panel may be used. It is also to be understood that a flexible awning panel may be supported, in place of a rigid awning panel, on two or more of the laterally disposed frome members 15, 16, 17 or 18.

Referring back to FIGURE 2, the awning panel 21 is shown as being removably and adjustably attached to the frame structure 10 by several forms of awning securing means. The threaded screw members 22, also shown in FIGURE 5, may be used, with or without the laterally disposed awning panel securing members 25, or vice versa. The screw members 22 are adapted to adjustably engage and secure the awning panel 21 to each, or to any selected laterally disposed frame member 11 of the frame structure 10.

The laterally disposed awning panel securing members 25, shown in FIGURES 1 to 5 inclusive, are adjustably and removably attached onto the vertically disposed threaded stud members 23. The stud members 23, located near each end of each awning securing member 25, are removably and threadably engaged to the lateral frame members 15, 16, 17 or 18. The axially and vertically adjustable threaded clamping member 24, on each stud member 23, engages the upper surface of the said lateral awning securing member 25 to provide free frictional engagement of the said lateral member 25 on the awning panel 21. The awning panel 21 is thereby longitudinally adjustable upon longitudinal movement on the stationary lateral frame members, and adjustably secured in the desired position by the said lateral awning securing members 25.

In FIGURE 4, there is shown a modified form of an adjustable supporting structure, wherein a single laterally disposed frame member generally designated by the said numeral 11, is slidably mounted and adjustably supported on the side frame members 13. Additional threaded apertures 26 on the forward side and 27 on the rear side of the said lateral frame member 11 are shown. Threaded apertures 26 or 27, adapted to receive the threaded stud members 23 thereto, provides angular supporting engagement of a rigidly supported awning panel, independently of the adjustable angularity of the frame structure 10 which is adjustably supported on the roof engaging and frame supporting means and the threaded stud members 30 or 32 attached thereto.

Longitudinally adjustable movement of the lateral frame member 11, in FIGURE 4, is denoted by A, and it is quite obvious therefore that the lateral frame member 11 may be removed at the forward end of the side frame members 13, and reattached at the rear end thereof. The frame structure 10 may then be moved rearwardly, as desired, through the attached longitudinal tubular frame supporting members 28 provided with thumb screws 29, or, removably attached upon engagement of the selected vertical apertures 14 to the vertical stud members 32, as shown in FIGURE 7.

In FIGURE 5, there is shown in a fragmentary view, the forward lateral frame member 15, which is substantially representative of the other lateral frame members 16, 17 and 18. The lateral frame member 15 may be of tubular construction, and is of a diameter greater than the attached side frame members 13, thus providing adjustable sliding engagement of the engaged horizontal apertures 19 to the said side frame members 13. Thumb screws 20, on the lateral frame members 11, are adapted to engage the side frame members 13 to adjustably secure and to prevent movement of the said lateral frame member or members 11 of the frame structure 10.

Referring back to the laterally disposed awning securing members 25, shown more clearly in FIGURES 2, 3, 4 and 5, when frictionally released by the threaded clamping members 24, and upon the omission of the securing screw members 22, enables a rigid awning panel 21 to be moved forwardly or rearwardly for any longitudinal adjustment. This particular adjustable movement of the awning panel 21 may be accomplished independent of any, or all of the laterally disposed frame members 11 remaining in a stationary position. The rigid awning panel 21 therefore, is extendable or retractable over and beyond the said laterally disposed frame member or members 11, and resecured in said adjustable position upon reclamping the said laterally disposed awning securing member or members 25 downwardly thereto.

The adjustable frame structure 10 may be of any substantial longitudinal length, with the attached adjustable awning panel 21 being of any desired longitudinal length independent of the said length of said frame structure 10, thereby providing a substantial area of both the roof top and the windshield area to be fully protected from any, and all elements of the weather, It is quite obvious that a rigid awning panel may be supported on only one, or more, laterally disposed frame members 11, and that a flexible awning panel may be supported on two, or more, laterally disposed frame members 11. Also, that the laterally disposed awning securing members 25 are adapted to frictionally engage and secure a flexible awning panel on two, or more, of the said lateral frame members 11.

The exceptional simplicity in the structural and the operational features of the novel awning structure; the numerous advantages in the various methods of erection and attachment on the roof of a motor vehicle; the various adjustments of the frame and awning structure; the removal of the awning and frame structure in whole or in part; and combined with the viewing and also driving pleasures and benefits derived; these objects, in addition to other objects previously cited, all enjoyed and of great benefit to the management and the patrons during inclement weather conditions, while viewing outdoor movies or any other outdoor event or activity.

While certain embodiments of my invention have been disclosed in the foregoing description, it will be understood that various modifications may occur to those skilled in the art. Changes, therefore, in the construction and arrangement, may be made without departing from the spirit and scope of the invention as disclosed in the appended claims.

I claim:

1. An adjustable rain awning structure adjustably supported over the roof top and the windshield area of an automobile comprising, a frame structure having longitudinally extending laterally spaced apart parallel frame members, a laterally directed frame member having a substantially greater vertical dimension than the said longitudinal frame members, said laterally directed frame member being provided with laterally spaced apart horizontal apertures freely engaging and adjustably supporting said lateral frame member onto the said longitudinal frame members for longitudinally adjustable sliding movement, means for releasably securing said lateral frame member along the length of each of said longitudinal members, an awning panel movably mounted on the said lateral frame member for movement transversely thereto, said awning panel adapted for extended or retracted movement over the windshield area and the roof top, and means for supporting the said frame structure to the roof top.

2. An adjustable rain awning structure adjustably supported over the roof top and the windshield area of an automobile comprising, a frame structure having longitudinally extending laterally spaced apart parallel frame members, a laterally directed frame member having a substantially greater vertical dimension than the said longitudinal frame members, said laterally directed frame member being provided with laterally spaced apart horizonal apertures freely engaging and adjustably supporting said lateral frame member onto the said longitudinal frame members for longitudinally adjustable sliding movement, means for releasably securing said lateral frame member along the length of each of said longitudinal members, a rigid awning panel movably mounted on the said lateral frame member for movement transversely thereto, said awning panel adapted for extended or retracted movement over the windshield area and the roof top, said awning panel adapted to be movably extended and suspended beyond either extreme end of the said longitudinal frame members, and means for supporting the said frame structure to the roof top.

3. An adjustable rain awning structure adjustably supported over the roof top and the windshield area of an automobile comprising, a frame structure having longitudinally extending laterally spaced apart parallel frame members, a laterally directed frame member having a substantially greater vertical dimension than the said longitudinal frame members, said laterally directed frame member being provided with laterally spaced apart horizontal apertures freely engaging and adjustably supporting said lateral frame member onto the said longitudinal frame members for longitudinally adjustable sliding movement, means for releasably securing said lateral frame member along the length of each of said longitudinal members, a rigid awning panel adjustably and movably mounted on the said lateral frame member for movement transversely thereto, a laterally disposed awning securing member adjustably supported above the said laterally disposed frame member, means on said lateral frame member adjustably supporting said lateral awning securing member, said awning securing member releasably engaging the upper surface of the said awning panel upon the vertical adjustment of said awning securing member to provide for the longitudinally movable relocation of said awning panel independently and freely of the longiutudinal position of the said longitudinally slidable laterally disposed frame member, and means for supporting the said frame structure to the roof top.

4. An adjustable rain awning structure adjustably supported over the roof top and the windshield area of an automobile comprising, a frame structure having longitudinally extending laterally spaced apart parallel frame members, laterally directed and longitudinally spaced frame member each having a substantially greater vertical dimension than the said longitudinal frame members, said laterally directed frame members being provided with laterally spaced apart horizontal apertures freely engaging and adjustably supporting said lateral frame members onto the said longitudinal frame members for longitudinally adjustable sliding movement, means for releasably securing said lateral frame members along the length of each of said longitudinal members, an awning panel movably mounted on at least one of the said movable lateral frame members for movement transversely thereto, said awning panel adapted for extended or retracted movement over the windshield area and the roof top and means for supporting the said frame structure to the roof top.

5. An adjustable rain awning structure adjustably supported over the roof top and the windshield area of an automobile comprising, a frame structure having longitudinally extending laterally spaced apart parallel frame members, laterally directed and longitudinally spaced frame members each having a substantially greater vertical dimension than the said longitudinal frame members, said laterally directed frame members being provided with laterally spaced apart horizontal apertures freely engaging and adjustably supporting said lateral frame members onto the said longitudinal frame members for longitudinally adjustable sliding movement, means for releasably securing said lateral frame members along the length of each of said longitudinal members, a rigid awning panel movably mounted on at least two of the said movable lateral frame members for movement transversely thereto, said awning panel adapted for extended or retracted movement over the windshield area and the roof top, said awning panel adapted to be movably extended and suspended beyond either extreme end of the said longitudinal frame members, and means for supporting the said frame structure to the roof top.

6. An adjustable rain awning structure adjustably supported over the roof top and the windshiled area of an automobile comprising, a frame structure having longitudinally extending laterally spaced apart parallel frame members, laterally directed and longitudinally spaced frame members each having a substantially greater vertical dimension than the said longitudinal frame members, said laterally directed frame members being provided with laterally spaced apart horizontal apertures freely engaging and adjustably supporting said lateral frame members onto the said longitudinal frame members for longitudinally adjustable sliding movement, means for releasably securing said lateral frame members along the length of each of said longitudinal members, an awning panel movably mounted on said movable lateral frame members for movement transversely thereto, said awning panel adapted for extended or retracted movement over the windshield area and the roof top, a laterally disposed awning securing member adjustably supported on a laterally disposed frame member, means on the said lateral frame member adjustably supporting said lateral awning securing member, said awning securing member releasably engaging the upper surface of the said awning panel upon the vertical adjustment of said awning securing member on the said lateral frame member, and means for supporting the said frame structure to the roof top.

References Cited by the Examiner

UNITED STATES PATENTS

| | | | |
|---|---|---|---|
| 3,088,772 | 5/1963 | Francis | 296—95 |
| 3,095,034 | 6/1963 | Francis | 296—95 X |

BENJAMIN HERSH, *Primary Examiner.*